United States Patent
Whytock et al.

(10) Patent No.: US 8,327,285 B2
(45) Date of Patent: *Dec. 4, 2012

(54) VIRTUAL KEYBOARD TEXT REPLICATION

(75) Inventors: John Christopher Whytock, Seattle, WA (US); Ali Moradd Vassigh, Bellevue, WA (US); Sabrina Boler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/268,105

(22) Filed: Oct. 7, 2011

(65) Prior Publication Data
US 2012/0030609 A1    Feb. 2, 2012

Related U.S. Application Data

(63) Continuation of application No. 11/765,370, filed on Jun. 19, 2007, now Pat. No. 8,078,984.

(51) Int. Cl.
*G06F 3/048* (2006.01)
*G06F 3/041* (2006.01)

(52) U.S. Cl. .................. 715/773; 715/780; 345/173

(58) Field of Classification Search .................. 715/225, 715/702, 773, 780; 345/168, 173
See application file for complete search history.

(56) References Cited

U.S. PATENT DOCUMENTS

| | | | |
|---|---|---|---|
| 5,917,476 A | 6/1999 | Czerniecki | |
| 7,042,442 B1 | 5/2006 | Kanevsky | |
| 7,098,896 B2 | 8/2006 | Kushler | |
| 7,439,957 B2 | 10/2008 | Chu | |
| 7,555,727 B2 | 6/2009 | Hawkins | |
| 2001/0011995 A1* | 8/2001 | Hinckley et al. | 345/156 |
| 2004/0263484 A1 | 12/2004 | Mantysalo | |
| 2005/0012723 A1* | 1/2005 | Pallakoff | 345/173 |
| 2006/0015819 A1 | 1/2006 | Hawkins | |
| 2006/0085748 A1 | 4/2006 | Luther | |
| 2006/0265668 A1 | 11/2006 | Rainisto | |
| 2008/0122796 A1 | 5/2008 | Jobs | |

FOREIGN PATENT DOCUMENTS

| | | |
|---|---|---|
| EP | 0651544 | 5/1995 |
| WO | WO0237254 | 5/2002 |
| WO | WO2007014064 | 2/2007 |

OTHER PUBLICATIONS

Apple's Tablet Virtual Keyboard UI, hrmpf on Feb. 16, 2006, http://hrmpf.com/wordpress/57/apples-tablet-virtual-keyboard-ui, 4 pages.

Perton, Marc, "Origami UI on CeBIT web site", Engadget, Mar. 8, 2006, http://www.engadget.com/2006/03/08/cebit-web-site-shows-origami-ui/, 6 pages.

(Continued)

*Primary Examiner* — Haoshian Shih
(74) *Attorney, Agent, or Firm* — Workman Nydegger

(57) ABSTRACT

Text that is selected at a virtual keyboard is submitted to and displayed at an application data field and is echoed at a keyboard data field that is in relatively close proximity to virtual keys used to select the text. Thus, a user does not have to alter their field of view to the application data field to determine what was submitted to the application data field.

22 Claims, 7 Drawing Sheets

OTHER PUBLICATIONS

2007 Microsoft Corporation, "Announcing the Ultra-Mobile PC", http://msdn2.microsoft.com/en-us/windowsvista/aa904971(d=printer).aspx, 3 pages (The year of publication, 2007, is clearly prior to the filing date of the Application. The month is therefore irrelevant.).
iphone, http://www.apple.com/iphone/technology, available as early as Jul. 1, 2010.
My-T-Touch, http://www.my-t-touch.com/myttouch/mtt.htm, available as early as Jul. 1, 2010, 5 pages.
Office Action dated Jul. 1, 2010 cited in U.S. Appl. No. 11/765,370.
Office Action dated Oct. 27, 2010 cited in U.S. Appl. No. 11/765,370.
Notice of Allowance dated Aug. 19, 2011 cited in U.S. Appl. No. 11/765,370.

* cited by examiner

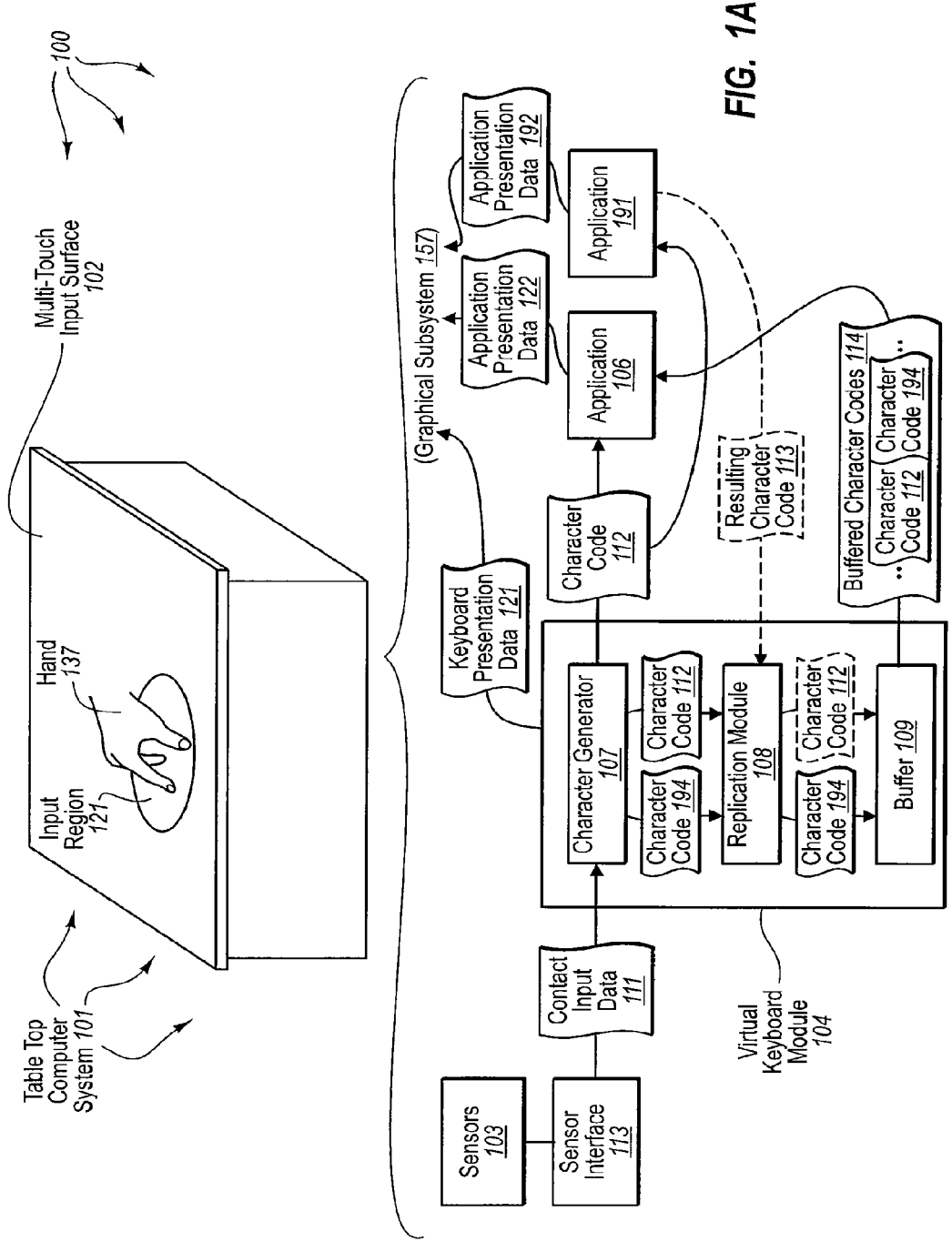

VIRTUAL KEYBOARD TEXT REPLICATION

CROSS-REFERENCE TO RELATED APPLICATIONS

This application is a continuation of U.S. patent application Ser. No. 11/765,370 filed on Jun. 19, 2007 and entitled "VIRTUAL KEYBOARD TEXT REPLICATION," which application is hereby expressly incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

A variety of input devices including keyboards, mice, game controllers, touch screens, scanners, stylus, etc can be used to input data in a computer system. However in many, if not most, corporate and home computing environments, a keyboard and mouse are typically used to provide the majority of user entered input to a computer system. For example, a user can use a mouse to select a location within an application or operating system (e.g., a data field) where data is to be entered or accessed. Subsequently, the user can use the keyboard to input text data or perform other options (e.g., cut and paste, etc.) at the selected location.

When using a physical keyboard, a user can typically tell, based on the change in resistance of a key, when a key has been sufficiently depressed. This tactile feedback relieves a user from having to constantly look at the physical keyboard to visual verify that input is being entered. Accordingly, the user's eyes are freed up to look at the data field where input is occurring and being displayed.

However, in many locations it is neither practical nor economical to connect external input devices to a computer system. For example, in many public environments, such as, for example, airports, shopping malls, etc., keyboards and mice would quickly wear out or become damaged due to the volume and diversity of use. Thus, many publicly accessible computer systems include touch screens that are configured output graphical data and permit a user to touch graphical data to implement behaviors associated with the graphical data (e.g., go to next page, make reservation, etc.). This type of input functionality can be sufficient for relatively simplistic applications where user input primarily consists of selecting presented options off of a screen.

Although, for more complex applications, keyboard based input provides significantly more input flexibility and may be required. As a result, some computing systems use software based "virtual" keyboards. A virtual keyboard is essentially a replica of a real keyboard (or portion thereof) that is presented on a touch screen. To enter a character, a user touches the touch screen in a location for the character they desire to input. Thus, a user can use a virtual keyboard to enter text into a data field at a computer system.

Unfortunately, when using a virtual keyboard, there is no way to provide the tactile feedback associated with using a physical keyboard. Thus, a user must focus their attention on the virtual keyboard in order to see what they are typing. This makes it difficult for a user to simultaneously verify that data entered into a data field is appropriate. Instead, the user must shift their field of focus to the data field to verify that input was appropriate (e.g., the correct character was entered, duplicate characters were not entered, etc.). Doing this for each entered character is inefficient and potentially burdensome to a user.

BRIEF SUMMARY

The present invention extends to methods, systems, and computer program products for replicating text at a virtual keyboard. A computer system shifts focus to an application data field presented on an interactive touch screen display. The computer system presents a virtual keyboard on the interactive touch screen display along with the application data field.

The virtual keyboard includes a plurality of virtual keys for entering characters into the application data field. The virtual keyboard also includes a keyboard data field for echoing characters entered into, presented at, or directed to the application data field. The keyboard data field, due at least to its proximity to the virtual keys, is more easily viewable relative to the one or more virtual keys than the application data field is relative to the one or more virtual keys. The keyboard data field can be configured to echo characters selected at the virtual keyboard or echo resulting characters entered at the application data field based on application data field logic applied to a selected virtual character. The computer system receives input indicating that at least one virtual key, from among the plurality of virtual keys, has been selected.

In some embodiments, the computer system provides a character corresponding to a selected virtual key to the application data field. The computer system echoes the character corresponding to the selected virtual key in the keyboard data field to provide more easily viewable feedback indicating what character was entered at the virtual keys. Accordingly, a user does not have to alter their field of view to the application data field to determine what character was entered.

In other embodiments, the computer system provides a character corresponding to a selected virtual key to the application data field. The computer system presents an altered character within the application data field based on application data field logic. For example, selecting an "A" from the virtual keyboard can result in a "2" being presented into a telephone number data field based on application data field logic that converts letters to numbers in accordance with standard telephone conversions. The computer system echoes the altered character in the keyboard data field to provide more easily viewable feedback indicating what character was presented within application data field. Continuing with the previous example, a "2" can be echoed at the keyboard data field in response to selecting an "A" from the virtual keyboard. Accordingly, a user does not have to alter their field of view to the application data field to determine what character was presented in the application data field.

In additional embodiments, the computer system accumulates the one or more characters corresponding to the selected one or more virtual keys in the keyboard data field to provide more easily viewable feedback indicating what characters were entered at the virtual keys. Accordingly, a user does not have to alter their field of view to determine what characters were entered. The computer system receives an indication that the one or more characters are to be forwarded to the application subsequent to accumulating the one more characters. The computer system sends the one or more characters to the application data field for presentation in response to the indication.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates an example computer architecture that facilitates replicating text at a virtual keyboard.

DETAILED DESCRIPTION

Figure 1B:
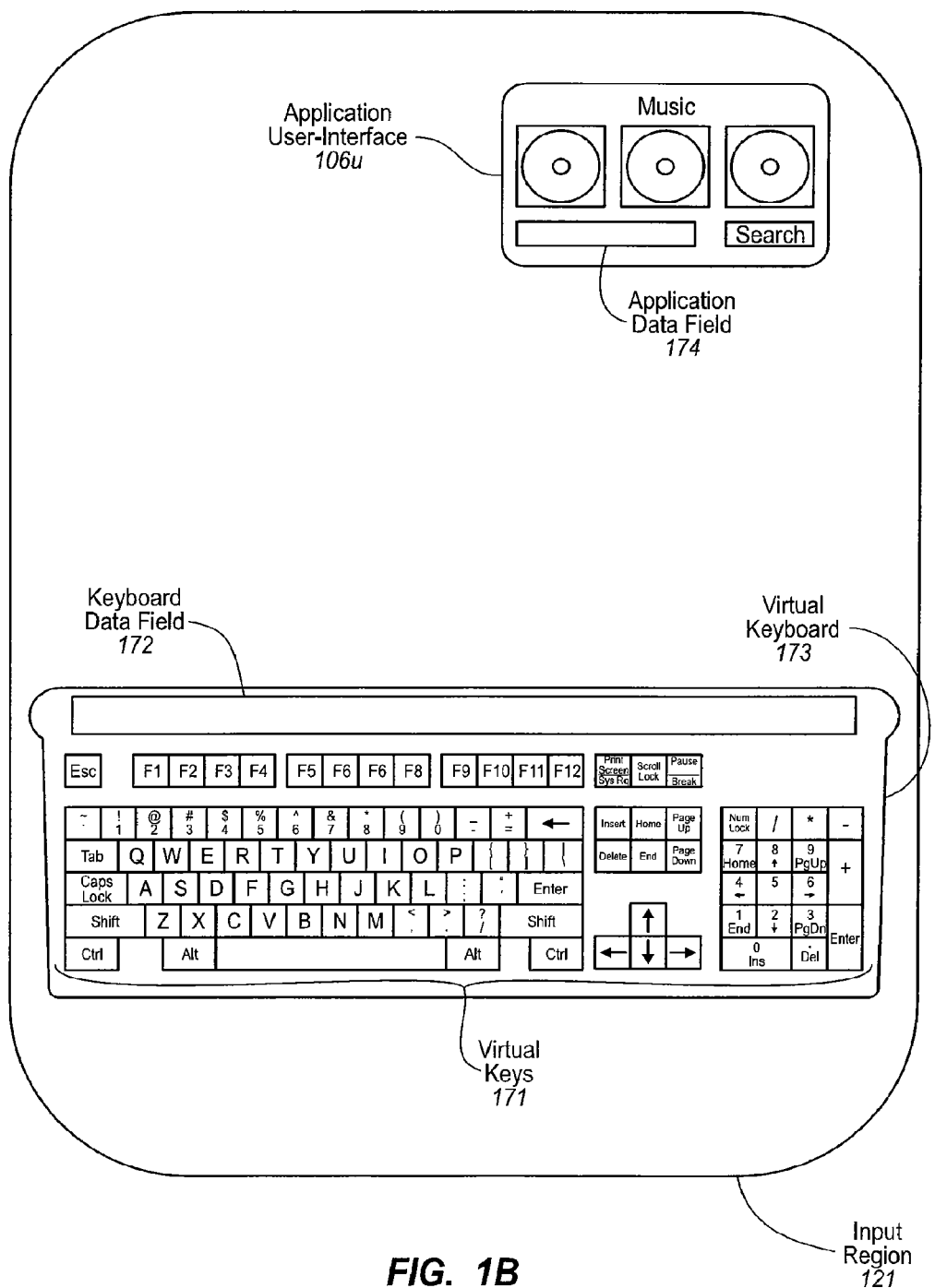
FIG. 1B illustrates a virtual keyboard relative to an application on a multi-touch input display surface.

The present invention extends to methods, systems, and computer program products for replicating text at a virtual keyboard. A computer system shifts focus to an application data field presented on an interactive touch screen display. The computer system presents a virtual keyboard on the interactive touch screen display along with the application data field.

The virtual keyboard includes a plurality of virtual keys for entering characters into the application data field. The virtual keyboard also includes a keyboard data field for echoing characters entered into, presented at, or directed to the application data field. The keyboard data field, due at least to its proximity to the virtual keys, is more easily viewable relative to the one or more virtual keys than the application data field is relative to the one or more virtual keys. The keyboard data field can be configured to echo characters selected at the virtual keyboard or echo resulting characters entered at the application data field based on application data field logic applied to a selected virtual character. The computer system receives input indicating that at least one virtual key, from among the plurality of virtual keys, has been selected.

In some embodiments, the computer system provides a character corresponding to a selected virtual key to the application data field. The computer system echoes the character corresponding to the selected virtual key in the keyboard data field to provide more easily viewable feedback indicating what character was entered at the virtual keys. Accordingly, a user does not have to alter their field of view to the application data field to determine what character was entered.

In other embodiments, the computer system provides a character corresponding to a selected virtual key to the application data field. The computer system presents an altered character within the application data field based on application data field logic. For example, selecting an "A" from the virtual keyboard can result in a "2" being presented into a telephone number data field based on application data field logic that converts letters to numbers in accordance with standard telephone conversions. The computer system echoes the altered character in the keyboard data field to provide more easily viewable feedback indicating what character was presented within application data field. Continuing with the previous example, a "2" can be echoed at the keyboard data field in response to selecting an "A" from the virtual keyboard. Accordingly, a user does not have to alter their field of view to the application data field to determine what character was presented in the application data field.

In additional embodiments, the computer system accumulates the one or more characters corresponding to the selected one or more virtual keys in the keyboard data field to provide more easily viewable feedback indicating what characters were entered at the virtual keys. Accordingly, a user does not have to alter their field of view to determine what characters were entered. The computer system receives an indication that the one or more characters are to be forwarded to the application subsequent to accumulating the one more characters. The computer system sends the one or more characters to the application data field for presentation in response to the indication.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates replicating text at a virtual keyboard. Depicted in computer architecture 100 is table top computer system 101. Table top computer system 101 includes sensors 103, sensors interface 113, virtual keyboard module 104, application 106, and graphical subsystem 157. Generally, the components of computer architecture 100, including sensors 103, sensors interface 113, virtual keyboard module 104, application 106, and graphical subsystem 157, interoperate to implement various embodiments for replicating text at a virtual keyboard.

Table top computer system 101 can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Sensors 103 can be configured to detect when a physical object (e.g., a bottle, a glass, a finger, a hat, etc.) has come into physical contact with a portion of the multi-touch input display surface 102. For example, sensors 103 can detect when a portion of hand 137 has come in contact with multi-touch input display surface 102. Sensors 103 can be embedded in multi-touch input display surface 102 and can include for example, pressure sensors, temperature sensors, image scanners, barcode scanners, etc., that interoperate with sensor interface 113 to detect multiple simultaneous inputs.

In some embodiments, multi-touch input display surface 102 includes sensors for implementing a touch screen interface. For example, multi-touch input display surface 102 can include an interactive multi-touch surface. Thus, it may be that multi-touch input display surface 102 also functions as a presentation surface to display video output data to a user of table top computer system 101.

Sensors 103 can be included (e.g., embedded) in a plurality of locations across multi-touch input display surface 102. Sensors 103 can detect locations where physical contact with the multi-touch input display surface 102 has occurred. The density of sensors 103 can be sufficient such that contact across the entirety of touch input display surface 102 can be detected. Thus, sensors 103 are configured to detect and differentiate between simultaneous contact at a plurality of different locations on the multi-touch input surface 102

Sensors 103 can sample the entire surface of multi-touch input display surface 102 at specified intervals, such as, for example, 1 ms, 5 ms, etc. for detected contact. At each sampling interval, raw sensor data indicating the sampling results, including locations and/or area of any detected contact with multi-touch input surface 102, is sent to sensor interface 113. Thus, sensor output from sensors 103 can be raw sensor signal data indicating contact at one or more different locations and/or areas on multi-touch input display surface 102.

Sensor interface 113 can receive raw sensor signal data from sensors 103 and can convert the raw sensor signal data into contact input data (e.g., digital data) that can be compatibly processed by other modules of table top computer system 101. Sensor interface 113 or the other modules can buffer contact input data as needed to determine changes in contact on multi-touch input display surface 102 over time.

For example, raw sensor signal data from sensors 103 can change (e.g., between sampling intervals) as new contacts are detected, existing contacts are moved, and existing contacts are released on multi-touch input surface 102. Thus, upon receiving an indication of contact on multi-touch input display surface 102, sensor interface 113 can initiate buffering of raw sensor signal data (e.g., within a buffer in system memory of table top computer system 101). As contacts on multi-touch input display surface 102 change, sensor interface 113 can track the changes in raw sensor signal data and update locations and ordering of detected contacts within the buffer.

For example, sensor interface 113 can determine that contact was first detected at a location and then no contact was subsequently at the location (e.g., a user pressed a key on a virtual keyboard and then released). Upon receiving an indication that contact is no longer detected in a particular location on multi-touch input display surface 102, sensor interface 113 can convert the contents of the buffer to contact input data (e.g., contact input data representing a selected key). Sensor interface 113 can then send the contact input data to other modules at table top computer system 101. Other modules can buffer the contact input data as needed to determine changes at a location over time.

Generally, virtual keyboard module 104 is configured to present and maintain a virtual keyboard on multi-touch input display surface. Virtual keyboard module can present a virtual keyboard in response to selecting an application data field within an application. FIG. 1B illustrates a virtual keyboard 172 relative to application user-interface 106U within input region 121. Referring now to FIG. 1B, application 106 can present and maintain application user-interface 106U on multi-touch input display surface 102. Subsequently, focus can be shifted to (e.g., through user selection of) application data field 174 for purposes of entering text. In response to the shift in focus, virtual keyboard module 104 can present and maintain virtual keyboard 173 on multi-touch input display surface 102.

As depicted virtual keyboard 173 is configured similar to a QWERTY keyboard. However, virtual keyboard 173 can be configured similar to essentially any type of real keyboard (e.g., simplified Dvorak, QWERTZ, AZERTY, QZERTY, Chorded [e.g., Turkish], etc). Accordingly, virtual keyboard 173 can include typewriter keys, function keys, application keys, cursor control keys, enter keys, a numeric keypad, operating system keys, etc. Virtual keyboard 173 can also be configured to present characters of essentially any alphabet such as, for example, English, French, German, Italian, Spanish, Arabic, Greek, Hebrew, Russian, Chinese, Japanese, Thai, Khmer, Hangul, Turkish, Swiss, Romanian, Indian dialects, etc.

Generally, virtual keyboard module 104 can receive input contact data (i.e., data representing contact with a virtual key) from sensor interface 113. From the input contact data, character generator 107 can generate the appropriate character code for a character from essentially any character set, such, as for example, Unicode, ASCII, EBCDIC, ISO-8859 character sets, ANSI, Microsoft® Windows® character sets, Shift JIS, EUC-KR, etc. Character generator 107 can send the character code to application 106. Application 106 can receive the character code and present the corresponding character in application data field 174.

Alternately to or in combination with sending a character code to application 106, character generator 107 can send a character code to replication module 108. Replication module 108 can receive the character code and present the corresponding character in keyboard data field 172. Accordingly, a user can be given a visual indication of the character that was sent to application data field 174, without having to alter their field of view to look at application data field 174.

Replication module 108 can also buffer one or more character codes in buffer 109. Character codes can remain stored in buffer 109 until an indication to send the character codes to application 106 is received. An indication to send character codes to application 106 can result from satisfying a logical condition (e.g., expiration of timer, detected period of inactivity, receiving a specified number of character codes, etc.) or receiving an express indication (e.g., activation of send control). Thus, in some embodiments, virtual keyboard module 104 serves as checkpoint. Virtual keyboard module 104 can present a sequence of buffered characters codes in keyboard data field 172 for verification. Then in response to an indication to send the buffered character codes, virtual keyboard module 104 can send the buffered sequence of character codes to application 106.

Upon receiving a character code, application 107 can apply application data field logic (e.g., data typing rules, validation rules, etc.) to alter a received character code. For example, when receiving character codes for a telephone number field, application 106 can alter character codes for letters (e.g., the letter "a") to corresponding character codes for numbers (e.g., a "2") of a standard telephone interface.

Application 106 can send altered character codes back to virtual keyboard module 108. Replication module 108 can receive the altered character code and present the corresponding character in keyboard data field 172. Thus, in response to selecting a virtual key for one character (e.g., an 'a'), the character actually displayed in application data field 174 (e.g., a '2') is instead echoed in keyboard data field 172. Accordingly, a user is given a visual indication of the character actually displayed at application data field 174, without having to alter their field of view to look at application data field 174.

FIGS. 1C through 1G depict various representations of virtually keyboard 173 and different application user-interfaces. Within FIGS. 1C through 1G virtual keyboard 173 and application user-interfaces are presented side by side to more easily compare the characters displayed in keyboard data field. However, it should be understood that the display location of virtual keyboard 173 and the display location of an application user-interface can be separated some amount of distance on multi-touch input display surface 102. The distance can be large enough that a user can not simultaneously view both virtual keyboard 173 and an application user-interface within the same field of focus. Although depending on the user, the distance of separation in FIGS. 1C through 1G may be enough.

Figure 1C:
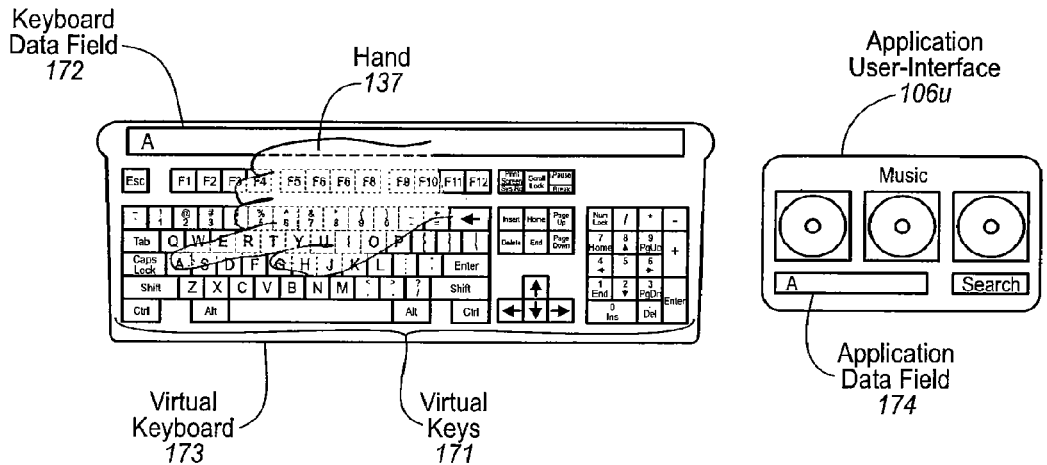
FIG. 1C illustrates an example of echoing a character at a virtual keyboard.
Figure 2:
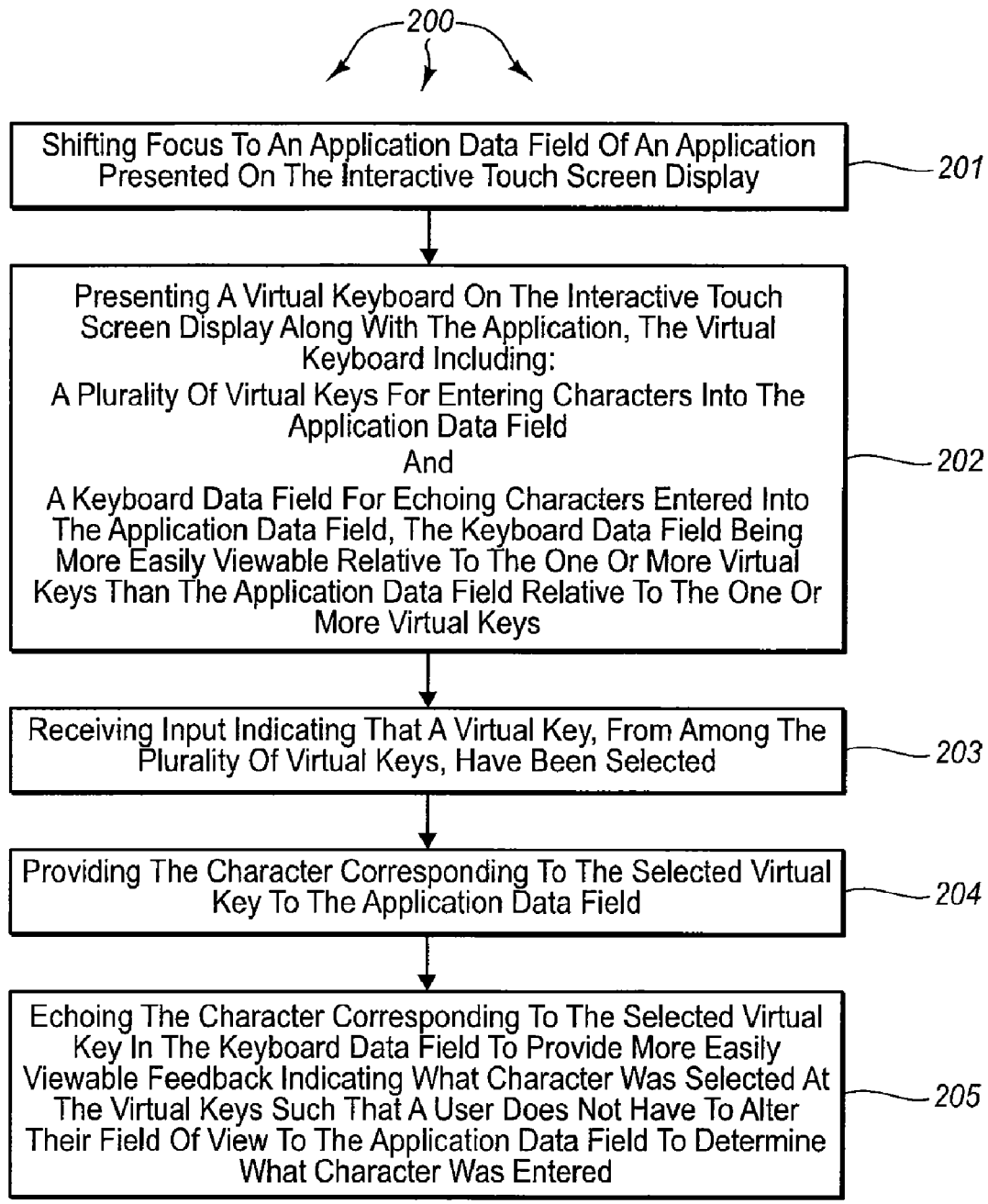
FIG. 2 illustrates a flow chart of an example method for replicating text entered at a virtual keyboard.

FIG. 1C illustrates an example of echoing a character at a virtual keyboard. FIG. 2 illustrates a flow chart of an example method 200 for replicating text entered at a virtual keyboard. The method 200 will be described with respect to the components and data depicted in computer architecture 100.

Method 200 includes an act of shifting focus to an application data field of an application presented on the interactive touch screen display (act 201). For example, referring to FIG. 1C, table top computer system 101 can shift focus (e.g., in response to user commands) to application data field 174.

Method 200 includes an act of presenting a virtual keyboard on the interactive touch screen display along with the application (act 202). The virtual keyboard can include plurality of virtual keys for entering characters into the application data field and a keyboard data field for echoing characters entered into the application data field. The keyboard data field is more easily viewable relative to the one or more virtual keys than the application data field relative to the one or more virtual keys.

For example, in response to a shift in focus to application data field 174, virtually keyboard module 104 can send keyboard presentation data 121 to graphical subsystem 175. From the keyboard presentation data 121, graphical subsystem can present virtual keyboard 173 on multi-touch input display surface 102. As depicted, virtual keyboard 173 includes virtual keys 171 and keyboard data field 172. Keyboard data field 172 is configured to echo characters that are entered into application data field 174.

Method 200 includes an act receiving input indicating that a virtual key, from among the plurality of virtual keys, have been selected (act 203). As depicted in FIG. 1C, the index finger of hand 137 can touch the 'A' key. Referring back to FIG. 1A, sensors 103 can detect contact at the location of the 'A' key. As a result of the contact, sensor interface can send contact input data 111 to virtual keyboard module 104. Virtual keyboard module 104 can receive contact input data 111 indicative of the 'A' key being selected.

Method 200 includes an act of providing the character corresponding to the selected virtual key to the application data field (act 204). For example, from input contact data 111, character generator 107 can generate character code 112 (a character code for the letter 'A'). Character generator 107 can provide character code 112 to application 106. Application 106 can include character code 112 in application presentation data 122. Graphical subsystem 157 can convert character code 112 to an 'A' for display in application data field 174.

Character codes can be provided to application 106 essentially immediately in response to receiving input (e.g., contact input data 111) indicating that a virtual key was selected. However, some processing delay can occur before character codes are provided to application 106. The processing delay can vary based on the configuration of table computer system 101 (e.g., processor speed, available system memory, other processing tasks being performed, etc.) at the time contact with a virtual key is detected.

Method 200 includes an act of echoing the character corresponding to the selected virtual key in the keyboard data field to provide more easily viewable feedback indicating what character was selected at the virtual keys (act 205). For example, character generator 107 can provide character code 112 to replication module 108. Replication module 108 can include character code 112 in keyboard presentation data 121. Graphical subsystem 157 can convert character code 112 to an 'A' for display in keyboard data field 172. Accordingly, a user does not have to alter their field of view to application data field 174 to determine what character was selected for entry into application data field 174.

Figure 1D:
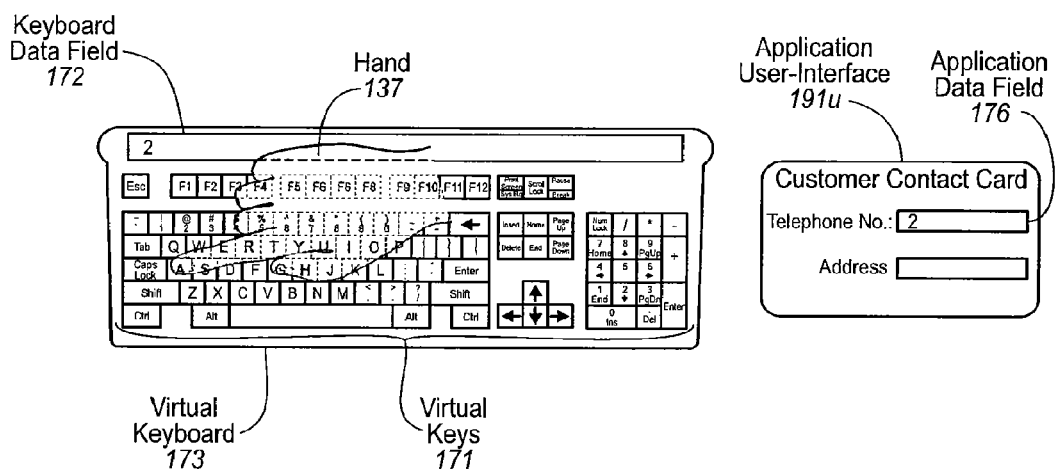
FIG. 1D illustrates an example of echoing an altered character at a virtual keyboard.
Figure 3:
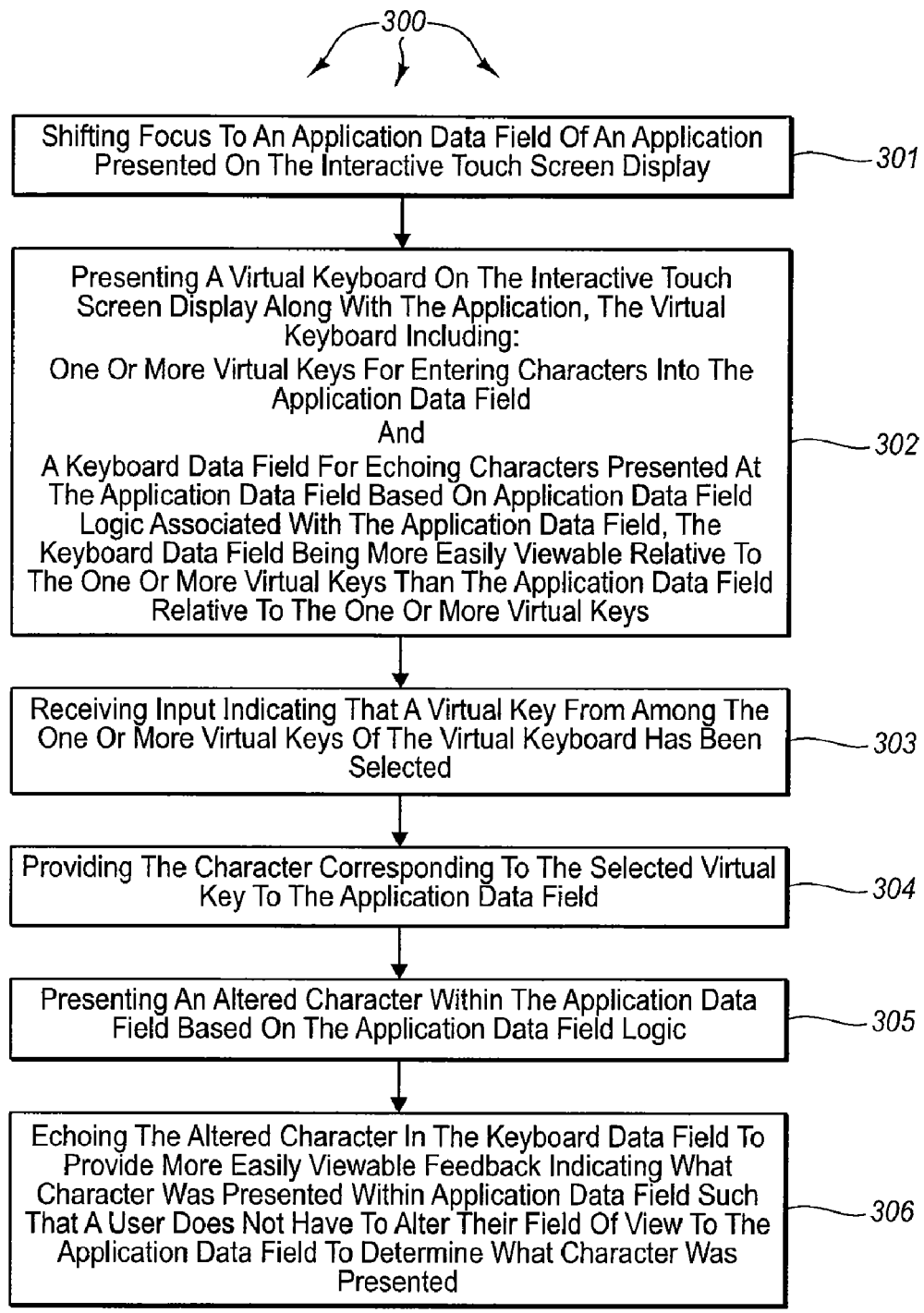
FIG. 3 illustrates a flow chart of an example method for replicating text entered into an application data field.

Characters can be echoed in keyboard data field 172 essentially immediately in response to receiving input (e.g., contact input data 111) indicating that a virtual key was selected. However, some processing delay can occur before character codes are echoed in keyboard data field 172. The processing delay can vary based on the configuration of table computer system 101 (e.g., processor speed, available system memory, other processing tasks being performed, etc.) at the time contact with a virtual key is detected FIG. 1D illustrates an example of echoing an altered character at a virtual keyboard. FIG. 3 illustrates a flow chart of an example method 300 for replicating text entered into an application data field. The method 300 will be described with respect to the components and data depicted in computer architecture 100.

Method 300 includes an act of shifting focus an application data field of an application presented on the interactive touch screen display (act 301). For example, referring to FIG. 1D, table top computer system 101 can shift focus (e.g., in response to user commands) to application data field 176.

Method 300 includes an act of presenting a virtual keyboard on the interactive touch screen display along with the application, (act 302). The virtual keyboard can include one or more virtual keys for entering characters into the application data field and a keyboard data field for echoing characters presented at the application data field based on application data field logic associated with the application data field. The keyboard data field being more easily viewable relative to the one or more virtual keys than the application data field relative to the one or more virtual keys.

For example, in response to a shift in focus to application data field 174, virtually keyboard module 104 can send keyboard presentation data 121 to graphical subsystem 175. From the keyboard presentation data 121, graphical subsystem can present virtual keyboard 173 on multi-touch input display surface 102. As depicted, virtual keyboard 173 includes virtual keys 171 and keyboard data field 172. Keyboard data field 172 is configured to echo characters that are presented at application data field 176 based on application data field logic (e.g., data typing rules, data validation rules, etc) associated with application data field 176.

Method 300 includes an act of receiving input indicating that a virtual key from among the one or more virtual keys of the virtual keyboard has been selected (act 303). For example, as depicted in FIG. 1D, the index finger of hand 137 can touch the 'A' key. Referring back to FIG. 1A, sensors 103 can detect contact at the location of the 'A' key. As a result of the contact, sensor interface can send contact input data 111 to virtual keyboard module 104. Virtual keyboard module 104 can receive contact input data 111 indicative of the 'A' key being selected.

Method 300 includes an act of providing the character corresponding to the selected virtual key to the application data field (act 304). For example, from input contact data 111, character generator 107 can generate character code 112 (a character code for the letter 'A'). Character generator 107 can provide character code 112 to application 191. Application 191 can apply application data field logic (e.g., data typing rules, data validation rules, etc) for application data field 176 to character code 112 to alter character code 112 (a character code for the letter 'A') to resulting character code 113 (e.g., a character code for the number '2'). Application 191 can include resulting character code 113 in application presentation data 192.

Method 300 includes an act of presenting an altered character within the application data field based on the application data field logic (act 305). For example, graphical subsystem 157 can convert resulting character code 113 to '2' for display in application data field 176 at application user-interface 191U.

Method 300 includes an act of echoing the altered character in the keyboard data field to provide more easily viewable feedback indicating what character was presented within application data field (act 306). For example, application 191 can send resulting character code 113 back to virtually keyboard module 104. Replication module 108 can include resulting character code 113 in keyboard presentation data 121. Graphical subsystem 157 can convert character code 113 to a '2' for display in keyboard data field 172. Accordingly, a user does not have to alter their field of view to application data field 176 to determine what character was presented at application data field 176.

Figure 1E:
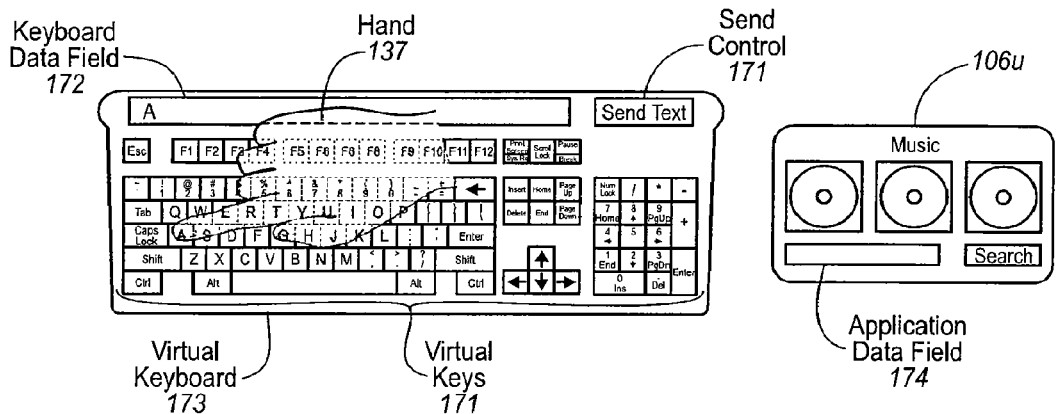
FIGS. 1E through 1G illustrate an example of accumulating characters and sending characters to an application.
Figure 1F:
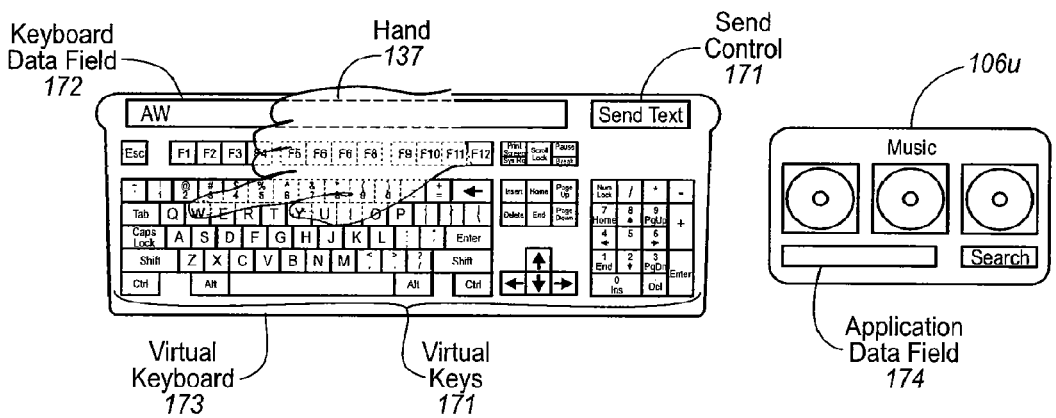
Figure 1G:
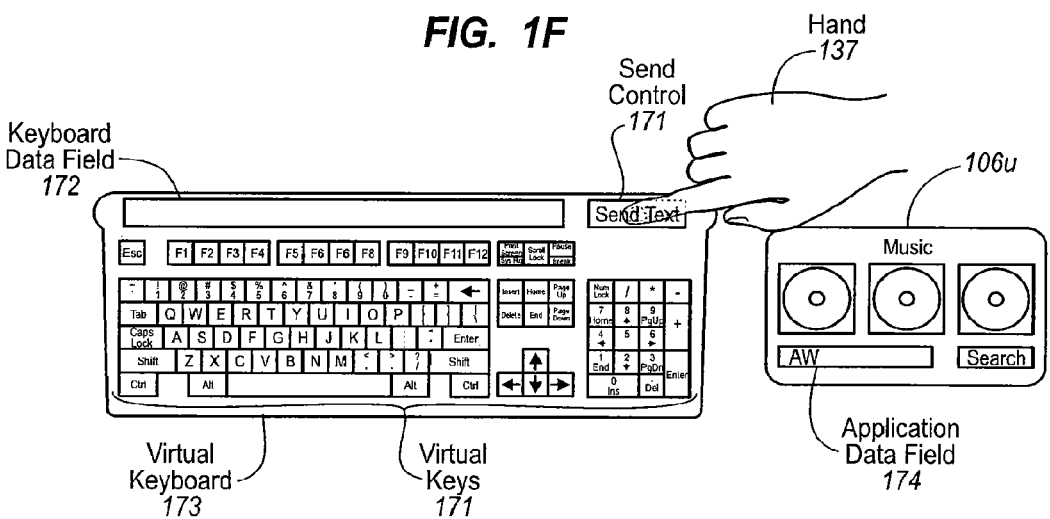
Figure 4:
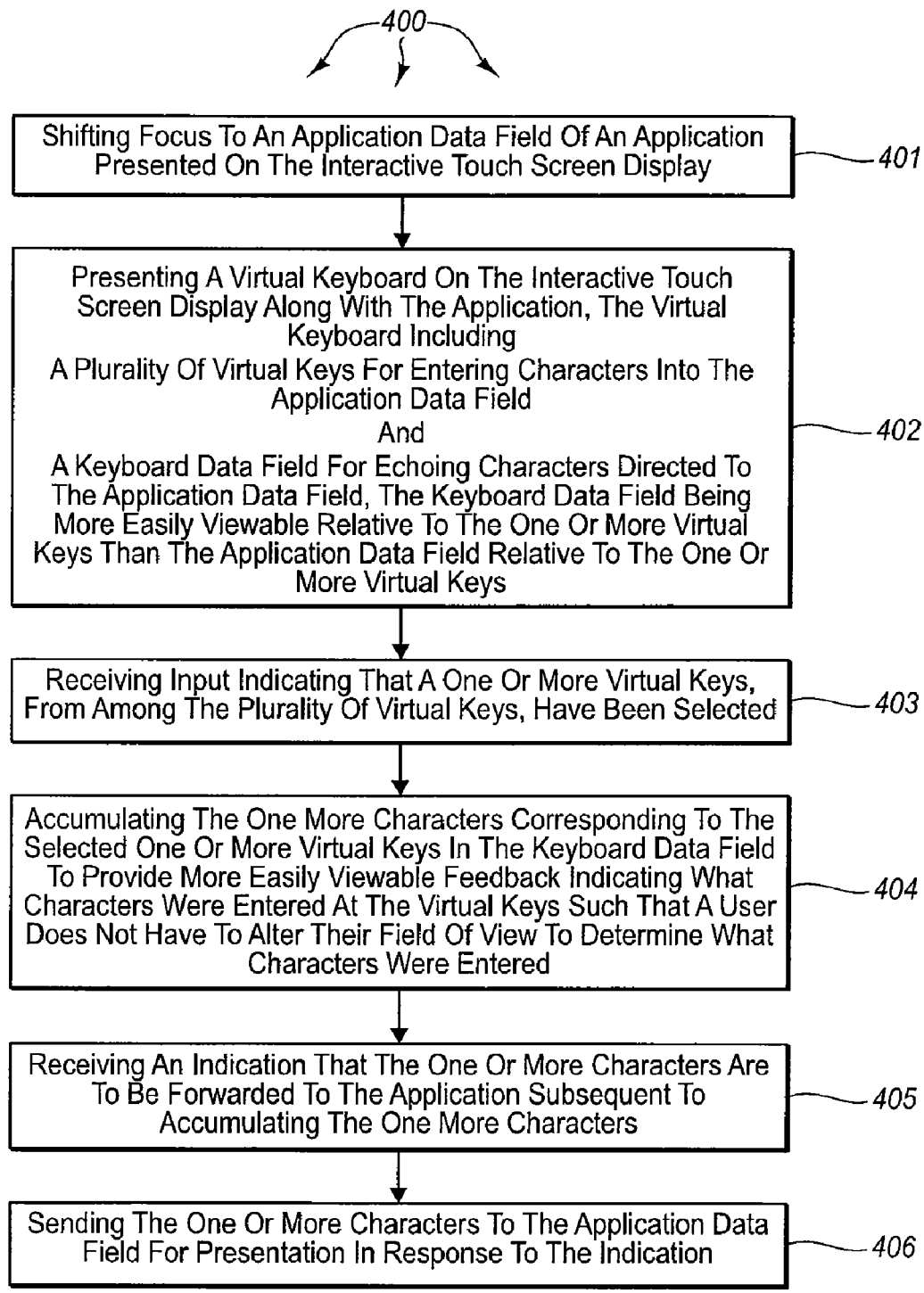
FIG. 4 illustrates a flow chart of an example method for sending accumulated text to an application.

FIGS. 1E through 1G illustrate an example of accumulating characters and sending characters to an application. FIG. 4 illustrates a flow chart of an example method 400 for sending accumulated text to an application. The method 400 will be described with respect to the components and data depicted in computer architecture 100.

Method 400 includes an act of shifting focus to an application data field of an application presented on the interactive touch screen display (act 401). For example, referring to FIG. 1E, table top computer system 101 can shift focus (e.g., in response to user commands) to application data field 174.

Method 400 includes an act of presenting a virtual keyboard on the interactive touch screen display along with the application (act 402). The virtual keyboard includes a plurality of virtual keys for entering characters into the application data field and a keyboard data field for echoing characters directed to the application data field. The keyboard data field being more easily viewable relative to the one or more virtual keys than the application data field relative to the one or more virtual keys.

For example, in response to a shift in focus to application data field 174, virtually keyboard module 104 can send keyboard presentation data 121 to graphical subsystem 175. From the keyboard presentation data 121, graphical subsystem can present virtual keyboard 173 on multi-touch input display surface 102. As depicted, virtual keyboard 173 includes virtual keys 171 and keyboard data field 172. Keyboard data field 172 is configured to echo characters directed to application data field 174. As depicted in FIG. 1D, virtual keyboard 172 also includes send control 177.

Method 400 includes an act of receiving input indicating that a one or more virtual keys, from among the plurality of virtual keys, have been selected (act 403). Method 400 includes an act of accumulating the one more characters corresponding to the selected one or more virtual keys in the keyboard data field to provide more easily viewable feedback indicating what characters were entered at the virtual keys (act 404). For example, as depicted in FIG. 1E, the index finger of hand 137 can touch the 'A' key. Referring back to FIG. 1A, sensors 103 can detect contact at the location of the 'A' key. As a result of the contact, sensor interface can send contact input data 111 to virtual keyboard module 104. Virtual keyboard module 104 can receive contact input data 111 indicative of the 'A' key being selected.

From input contact data 111, character generator 107 can generate character code 112 (a character code for the letter 'A'). Character generator 107 can provide character code 112 to replication module 108. Replication module 108 can include character code 112 in keyboard presentation data 121. Graphical subsystem 157 can convert character code 112 to an 'A' for display in keyboard data field 172. Character generator 107 can also store character code 112 in buffer 109.

Subsequently, as depicted in FIG. 1F, the index finger of hand 137 can touch the 'W' key. Referring back to FIG. 1A, sensors 103 can detect contact at the location of the 'W' key. As a result of the contact, sensor interface can send contact input data 111 to virtual keyboard module 104. Virtual keyboard module 104 can receive contact input data 111 indicative of the 'W' key being selected.

From input contact data 111, character generator 107 can generate character code 194 (a character code for the letter 'W'). Character generator 107 can provide character code 194 to replication module 108. Replication module 108 can include character code 194, along with character code 112, in keyboard presentation data 121. Graphical subsystem 157 can convert character code 194 to a 'W' for display, along with the 'A', in keyboard data field 172. Character generator 107 can also store character code 194, along with character code 112, in buffer 109.

One or more other characters can also be accumulated in keyboard data field 172 as appropriate. Accordingly, a user does not have to alter their field of view to determine what characters were entered at virtual keys 171.

Method 400 includes an act of an act of receiving an indication that the one or more characters are to be forwarded to the application subsequent to accumulating the one more characters (act 405). For example, refereeing to FIG. 1G, subsequent to accumulating characters in keyboard data field 172, the index finger of hand 137 can touch send control 177. Referring back to FIG. 1A, sensors 103 can detect contact at the location of send control 177. As a result of the contact, sensor interface can send contact input data 111 to virtual keyboard module 104. Virtual keyboard module 104 can receive contact input data 111 indicative of send control 177 being selected. Selection of send control 177 indicates to virtual keyboard module 104 that accumulated characters are to be sent to application 106.

Alternately, satisfaction of a logical condition can indicate that characters are to be forwarded to application 106. For example, virtual keyboard module 104 can detect expiration of timer, a period of inactivity, receipt a specified number or character codes, etc, which indicate to virtual keyboard module 104 that accumulated characters are to be sent to application 106

Method 400 includes an act of an act of sending the one or more characters to the application data field for presentation in response to the indication (act 406). For example, virtual keyboard module 104 can send buffered character codes 114 to application 106 in response to selection of send control 177 or satisfaction of a logical condition. As depicted, buffered character codes 114 includes at least character codes 112 and 194.

Application 106 can include buffered character codes 114 character in application presentation data 122. Graphical subsystem 157 can convert buffered character codes to corresponding characters for display in application data field 174. For example, as depicted in FIG. 1G, characters 'A' and 'W' are displayed in application data field 174.

Accordingly, embodiments of the invention permit a user to much more easily see what they typed using a virtual keyboard. The need to alter a visual field of focus between an application data field and a virtual keyboard is significantly mitigated, if not eliminated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including an interactive touch screen display, a method for replicating text entered at a virtual keyboard into a plurality of separate data fields, the method comprising:

an act of presenting a virtual keyboard on the interactive touch screen display along with an application data field which is visibly separated from the virtual keyboard, the virtual keyboard including:

a plurality of virtual keys for entering characters into the application data field; and a keyboard data field, which is distinguished from the application data field and which is visibly separated from the keyboard data field;

an act of receiving user input selecting a virtual key, from among the plurality of virtual keys;

an act of providing character input corresponding to the selected virtual key to an application associated with the application data field;

an act of presenting a visual representation of the character input corresponding to the selected virtual key in either of the application data field or the keyboard data field;

an act of subsequently echoing the visual representation of the character input corresponding to the selected virtual key in the keyboard data field or the application data field, without requiring additional user input, such that the character input is displayed at both the application data field as well as the keyboard data field, automatically in response to receiving the user input selecting the virtual key, without requiring additional user input for activating a send control, and to thereby provide more easily viewable feedback indicating the selection of the virtual key and such that a user does not have to alter a field of view from the virtual keyboard to the application data field to determine what character was selected.

2. The method recited in claim 1, wherein the visual representation of the character input corresponding to the selected virtual key is provided to the keyboard data field subsequent to the character input being provided to the application.

3. The method recited in claim 1, wherein the visual representation of the character input corresponding to the selected virtual key is presented at the keyboard data field prior to being presented at the application data field.

4. The method recited in claim 1, wherein the visual representation of the character input corresponding to the selected virtual key is presented at the application data field prior to being presented at the virtual keyboard data field.

5. The method as recited in claim 1, wherein the virtual keyboard is presented subsequent to presenting the application data field and wherein the method includes presenting the virtual keyboard in response to receiving user input indicative of a desire to enter text into the application data field.

6. The method as recited in claim 1, wherein the virtual keyboard includes typewriter keys, function keys, application keys, cursor control keys, enter keys, a numeric keypad, and operating system keys.

7. The method as recited in claim 1, wherein the act of providing a visual representation of the character input corresponding to the selected virtual key is performed essentially immediately in direct response to receiving the user input selecting the virtual key.

8. At a computer system including an interactive touch screen display, a method for replicating text entered at a virtual keyboard into a plurality of data fields, the method comprising:
an act of presenting an application data field corresponding to an application on an interactive touch screen;
an act of presenting a virtual keyboard on the interactive touch screen along with the application data field, the virtual keyboard including:
one or more virtual keys; and
a keyboard data field, which is distinguished from and visually separated from the application data field, the one or more virtual keys being closer in proximity to the keyboard data field than the application data field;
an act of receiving input selecting a virtual key from among the one or more virtual keys of the virtual keyboard;
an act of providing a character corresponding to the selected virtual key to the application associated with the application data field;
an act of the application applying logic to the character and presenting an altered character within either of the application data field and the keyboard data field, based on the application data field logic; and
an act of echoing the altered character in the keyboard data field or the application data field, automatically, without requiring additional user input for activating a send control at the virtual keyboard, and such that the altered character is displayed at both the application data field as well as the keyboard data field.

9. The method of claim 8, wherein the altered character corresponding to the selected virtual key is presented at the keyboard data field subsequent to the character being provided to the application.

10. The method of claim 8, wherein the altered character corresponding to the selected virtual key is presented at the keyboard data field subsequent to being presented at the application data field.

11. The method of claim 8, wherein the altered character corresponding to the selected virtual key is presented at the keyboard data field prior to being presented at the application data field.

12. The method recited in claim 8, wherein the character is provided to the application and the keyboard data field substantially immediately in direct response to receiving the user input selecting the virtual key.

13. The method recited in claim 12, wherein the character is also displayed at the application data field substantially immediately in direct response to receiving the user input selecting the virtual key.

14. The method recited in claim 8, wherein the altered character is sent to the keyboard data field from the application associated with the application data field.

15. A device having an interactive touch screen display that is configured to receive user input at a virtual keyboard that is presented on the device and that is also configured to echo input corresponding to the selected keyboard input at a plurality of data fields that are displayed on the device, the device comprising:
an interactive touch screen display;
memory storing instructions which, when executed, implement a method that includes:
an act of presenting an application data field on the interactive touch screen display;
an act of presenting a virtual keyboard, having (1) a plurality of virtual keys and (2) a keyboard data field, on the interactive touch screen display, but visibly separated from the application data field, with the plurality of keys being closer in proximity to the keyboard data field than the application data field;
an act of receiving user input selecting a virtual key, from the virtual keyboard;
an act of providing a character corresponding to the selected virtual key to an application associated with the application data field;
an act of the application providing the character data to the application data field and the keyboard data field, which causes a visual representation of the character data to be automatically presented at both of the application data field and the keyboard data field, in direct response to the user input selecting the virtual key and without requiring additional input to be entered at the virtual keyboard to activate a send control.

16. The device of claim 15, wherein the visual representation of the character data is an altered form of a corresponding visual representation of a character presented on the selected virtual key.

17. The device of claim 15, wherein the visual representation of the character data corresponds to a different character than a character presented on the selected virtual key.

18. The device of claim 15, wherein the visual representation of the character data corresponds to a same character as a character presented on the selected virtual key.

19. The device of claim 15, wherein the visual representation of the character data corresponding to the selected virtual key is presented at the keyboard data field and the application data field subsequent to the character data being provided to the application.

20. The device of claim 15, wherein the visual representation of the character data corresponding to the selected virtual key is presented at the keyboard data field and the application data field substantially immediately in direct response to the user input selecting the virtual key.

21. The method of claim 1, wherein the character input corresponding to the selected virtual key is provided to the application in response to a detected period of inactivity or expiration of a timer.

22. The method of claim 1, wherein the character input corresponding to the selected virtual key is provided to the application in response to a detecting a specified amount of entered character input.

* * * * *

UNITED STATES PATENT AND TRADEMARK OFFICE
CERTIFICATE OF CORRECTION

PATENT NO. : 8,327,285 B2
APPLICATION NO. : 13/268105
DATED : December 4, 2012
INVENTOR(S) : John Christopher Whytock et al.

It is certified that error appears in the above-identified patent and that said Letters Patent is hereby corrected as shown below:

In Column 12, Line 52, delete "keyboard" and insert -- application --, therefor.

Signed and Sealed this
Twenty-second Day of January, 2013

David J. Kappos
*Director of the United States Patent and Trademark Office*